United States Patent
Preston et al.

(10) Patent No.: US 8,218,971 B2
(45) Date of Patent: Jul. 10, 2012

(54) ROOM ASSOCIATION DEVICE CONVEYING SECTOR DATA FOR IN-ROOM POSITION AND FACING DETERMINATIONS

(75) Inventors: Steven Preston, Winter Springs, FL (US); Edward S. Kaprocki, Debary, FL (US); Thomas H. Penner, Apopka, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 360 days.

(21) Appl. No.: 12/684,712

(22) Filed: Jan. 8, 2010

(65) Prior Publication Data
US 2012/0070152 A1  Mar. 22, 2012

(51) Int. Cl.
*H04B 10/00* (2006.01)
(52) U.S. Cl. ......... 398/135; 398/127; 398/128; 398/137
(58) Field of Classification Search .................. 398/118, 398/126–128, 135, 137
See application file for complete search history.

(56) References Cited

U.S. PATENT DOCUMENTS

| | | | |
|---|---|---|---|
| 4,948,371 A * | 8/1990 | Hall | 434/21 |
| 7,499,713 B2 * | 3/2009 | Gasbarro et al. | 455/456.1 |
| 7,969,297 B2 * | 6/2011 | Haartsen et al. | 340/531 |
| 2009/0053679 A1 * | 2/2009 | Jones et al. | 434/22 |
| 2011/0210843 A1 * | 9/2011 | Kummetz | 340/517 |

* cited by examiner

*Primary Examiner* — Dalzid Singh
(74) *Attorney, Agent, or Firm* — Jetter & Associates, P.A.

(57) ABSTRACT

A processor can determine a relative position within a room of a person wearing a force-on-force device based exclusively upon sensed optical signals detected by optical sensors connected to the force-on-force device. Each of the sensed optical signals is geographically focused within a spatially constrained zone. Each sensed optical signal can further include digitally encoded data indicating an optical source that emitted the sensed optical signal and a spatially constrained zone of the sensed optical signal. The relative position can be determined based on determining a grid within the room within which the person is located. The grid can be defined by overlapping ones of the spatially constrained zones of the sensed optical signals.

19 Claims, 5 Drawing Sheets

Force-on-Force Device 410

| Hardware 420 |
|---|
| Processor 422
Memory 424
Optical Sensors 426
RF Transmitter 428
Weapon 430
Weapon Simulation Attachment 432
Bus 434 |

| Computer Program Product 440 |
|---|
| Optical Decoder 442
Event Handler 444
RF Encoder 446
Facing Logic Unit 448 |

FIG. 4

Computing Device 510

| Hardware 520 |
|---|
| Processor 522
Volatile Memory 523
Non-Volatile Memory 524
Network Transceiver 526
Bus 528 |

| Computer Program Product 530 |
|---|
| Operating System 532
Simulation Manager 534
Location Determination Unit 536
Facing Direction Unit 538
Fire Reading Unit 540
Configuration Unit 542 |

ROOM ASSOCIATION DEVICE CONVEYING SECTOR DATA FOR IN-ROOM POSITION AND FACING DETERMINATIONS

STATEMENT REGARDING FEDERALLY SPONSORED RESEARCH OR DEVELOPMENT

This invention was made with U.S. Government support under Contract No. N61339-01-D-0717-0003 awarded by the U.S. Navy. The Government has certain rights in the invention including a paid-up license and the right in limited circumstances to require the patent owner to license others on reasonable terms as provided by for the terms of Contract No. N61339-01-D-0717-0003 awarded by the U.S. Navy.

BACKGROUND

The disclosure relates to the field of simulation devices and, more particularly, to room association devices conveying sector data for in-room position and facing determinations.

Simulation training systems, such as tactical engagement simulation (TES) systems, fire fighting simulation systems, and the like, are crucial for preparing responders to handle dangerous real world situations. Enclosed spaces, such as rooms, can be used for simulations. Rooms pose problems for many radio frequency (RF) based communication systems and tracking devices. This is especially true when room boundaries are significant within a simulation.

Communications and/or tracking signals violating room boundaries, which is the case for RF signals, can result in significant simulation anomalies. In another example, line-of-sight plays a key factor in simulation, due to a fog-of-war effect, so that responder presented data during the simulation needs to be restricted to information that is available in a real action. Additionally, timing of simulation events within a room can be out synch (by seconds or more) with simulation events external to the room.

Participants receiving simulation based training are often equipped with a number of sensors. For example, participants of force-on-force exercises are often equipped with Multiple Integrated Laser Engagement System (MILES) compliant sensors, which detects "shots" fired from MILES based weapons, which are typically lasers that operate at approximately 904 nm. While there may be MILES sensors used to determine very coarse position, no known system has utilized cross sectored MILES (or equivalent) scanning to determine in-room positions of simulation participants with a high level of accuracy. Further, no known system has been able to determine participant firing direction using MILES (or equivalent) sensors.

BRIEF SUMMARY

The disclosure can be implemented in accordance with numerous aspects described herein. One aspect of the invention can include a method or computer program product for determining a relative position of a person in a room. In the method, a processor can determine a relative position within a room of a person wearing a force-on-force device based exclusively upon sensed optical signals detected by optical sensors connected to the force-on-force device. Each of the sensed optical signals is geographically focused within a spatially constrained zone. Each sensed optical signal can further include digitally encoded data indicating an optical source that emitted the sensed optical signal and a spatially constrained zone of the sensed optical signal. The relative position can be determined based on determining a grid within the room within which the person is located. The grid can be defined by overlapping ones of the spatially constrained zones of the sensed optical signals.

Another aspect of the disclosure includes a Multiple Integrated Laser Engagement System (MILES) compliant force-on-force system, which includes two or more room association devices (RAD) (all but one of which can be replaced by a room support device (RSD) subset that performs only the optical scanning action), force-on-force device, and a computing device. Each RAD can include an optical signal transmitter, a radio frequency (RF) receiver, and a network transmitter. Each RAD can emit, via the optical transmitter, spatially constrained optical signals along a set of different zones, each zone having a zone specific identifier encoded within the optical signal and having an identifier of the RAD encoded within the optical signal. Each of the optical signals can have a wavelength of approximately 904 nm and can be digitally encoded in a format compliant with a MILES defined standard. The force-on-force device can include a set of optical sensors and an RF transmitter. The force-on-force device can detect, via one of the optical sensors, the optical signals emitted from the RADs. The force-on-force device can also encode data detected within the optical signals into a RF signal transmitted via the RF transmitter. The computing device can include a processor and a network receiver. The RF receiver of each of the RADs can receive RF signals transmitted by the force-on-force device. The network transmitter of each of the RADs can transmit data received via the RF signals to the computing device via the network transmitter. The processor can execute a computer program product for determining a relative position within a room of a person wearing a force-on-force device based upon the data received via the network receiver. The data used by the processor can be contained in the transmission received from the RADs.

Still another aspect of the disclosure includes a RAD that includes a processor for processing programmatic instructions, a memory comprising a storage medium, an optical signal transmitter, a RF signal receiver, a network transmitter, a bus, and a logic unit. The optical signal transmitter can be for emitting optical signals in a set of different spatially constrained zones. Each optical emission can include digitally encoded data comprising a unique transmitter key associated with the RAD and a unique sector key that uniquely identifies which of the different spatially constrained zones is associated with the optical emission. The bus can communicatively link the processor, the memory, the optical signal transmitter, the RF signal receiver, and the network transceiver. The logic unit can include at least one computer program product stored in the memory and executable by the processor. Execution of at least one computer program product of the logic unit causes the RAD to perform a number of actions. One action is to receive content digitally encoded in the RF communications received by the RF signal receiver. The received content can include data uniquely identifying a person wearing a detection device, data identifying one of a set of optical sensors worn by the person. The identified optical sensor can be one that detected at least one optical emission transmitted by the optical signal transmitter. Additional data can include data identifying the unique transmitter key and the sector key encoded within the identified optical sensor. Another action can be to transmit a digitally encoded message via the network transmitter. The digitally encoded message can include encoded information based at least in part on the received content for determining a triangulated relative position of the person. The triangulation can be based exclusively on optical emissions detected by the detection device. The optical emissions can include at least one optical emission of the optical signal transmitter.

Yet another aspect of the disclosure includes a force-on-force device, which includes a processor for processing programmatic instructions, a memory comprising a storage medium, a set of optical sensors, an RF signal transmitter, a bus, and a logic unit. The bus can communicatively link the processor, the memory, the optical sensors, and the RF signal transmitter. The logic unit can include at least one computer program product stored in the memory that is executable by the processor. Execution of at least one computer program product of the logic unit can cause the force-on-force device to perform a number of actions as follows. At least two different optical signals emitted from different optical transmitters can be received. The at least two different optical signals are two of the sensed optical signals. For each received optical signal content contained within the sensed optical signals can be decoded via a processor. The content can include an indicator of the optical source and the spatially constrained zone of the received optical signal. A storage medium can be queried for a unique identifier of the force-on-force device. At least one RF signal can be transmitted. The RF signal can include digitally encoded RF data. The RF data can include the identifier of the optical source and the spatially constrained zone of each of the received optical signal as well as a sensor identifier of a sensor that received each optical signal. The RF data also include the unique identifier of the force-on-force device.

DETAILED DESCRIPTION

The disclosure projects optical signals (e.g., MILES compliant laser emissions operating at approximately 904 nm) from multiple different devices in a room. Each device produces spatially different optical emissions which are spatially constrained in a series of defined sectors. In one embodiment, a scanning laser can be utilized. For each spatially constrained emission, a sector and a projecting device identifier can be encoded within the signal. A force-on-force device (or other receiving device) worn by a person can detect the optical signals emitted from the different devices. An identifier that uniquely identifies the emission device and the sector can be decoded from the received emissions. Thus, it can be determined which "grid" or combination of spatially constrained sectors a person is located, which is the equivalent to determine a person's relative position in a room. Absolute position can be optionally determined using this relative position and a known reference point within the room. In various embodiments, optically defined grids can be two-dimensional or three-dimensional.

In one embodiment, multiple different sensors positioned about a wearer's head can be utilized that move when the wearer's head moves. A relative position of a wearer's head in relationship to an optical emission device can be determined given knowledge of which sensor received an optical signal. Given signals from multiple different optical emission devices, a person's facing direction within a room can be ascertained. In one embodiment, facing direction can be determined for a single plane (e.g., a horizontal plane) or for multiple planes (e.g., horizontal and vertical, where vertical can correspond to a head tilt angle).

The disclosure may be embodied as a method, system, or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the disclosure may take the form of a computer program product on a computer-usable storage medium having computer-usable program code embodied in the medium. In a preferred embodiment, the disclosure is implemented in software which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device. Any suitable computer-usable or computer-readable medium may be utilized. The computer-usable or computer-readable medium may be, for example but not limited to, an electronic, magnetic, optical, electromagnetic, infrared, or semiconductor system, apparatus, or device. Examples of a computer-readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk-read only memory (CD-ROM), compact disk-read/write (CD-R/W) and DVD.

Computer program code for carrying out operations of the disclosure may be written in an object-oriented programming language such as JAVA, Smalltalk, C++, or the like. However, the computer program code for carrying out operations of the disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
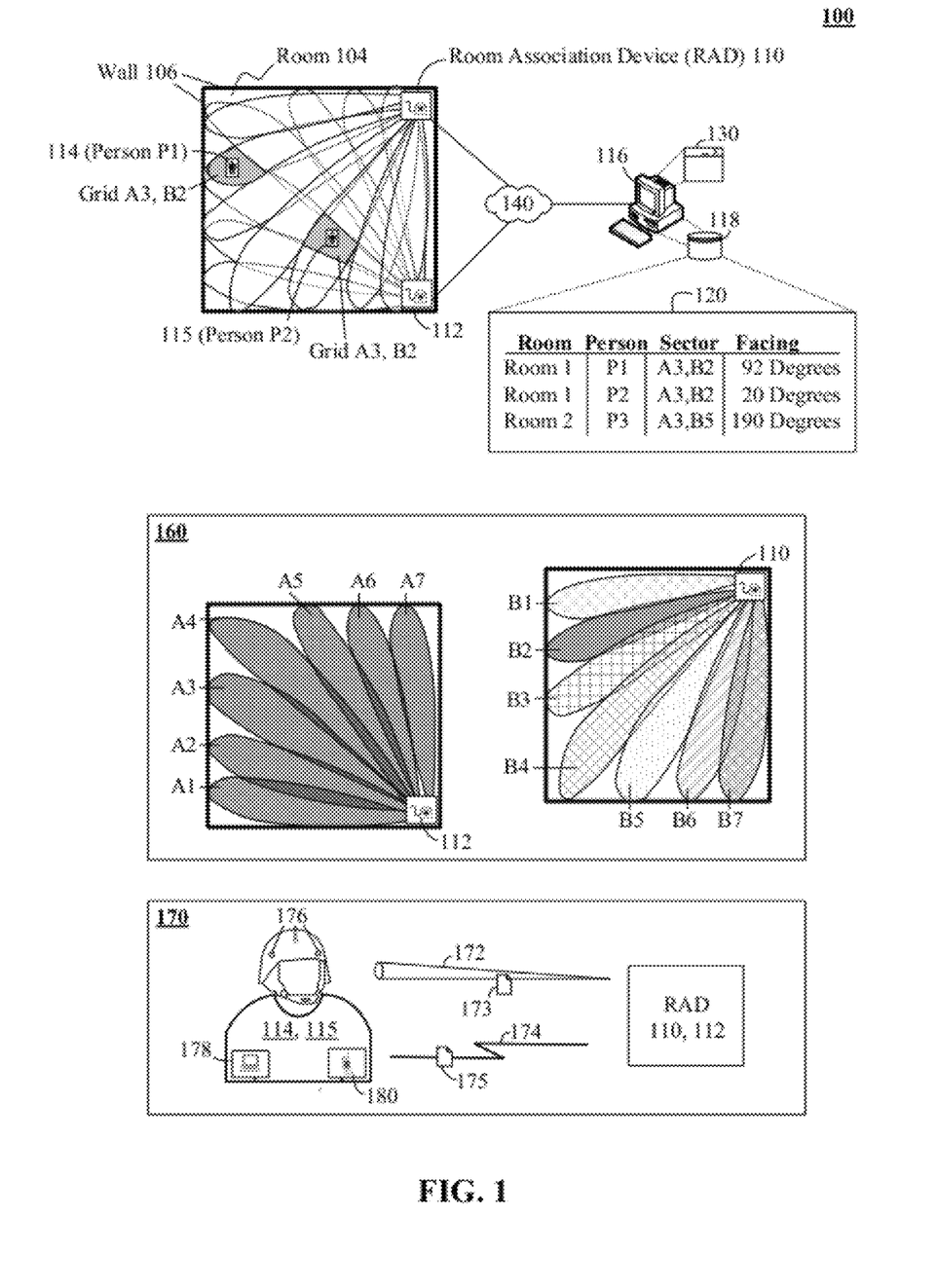
FIG. 1 includes a diagram for using output from two or more room association devices (RADs) to triangulate a potion of in-room people in accordance with an embodiment of the inventive arrangements associated herein.

System 100 is a diagram for using output from two or more Room Association Devices (RADs) 110 (or a combination of RADs and Room Support Devices (RSDs)) to triangulate a potion of in-room people in accordance with an embodiment of the inventive arrangements associated herein. More specifically, a grid can be formed within a room 104 by using transmissions (172) from two or more RADs 110, 112. Each RAD can generate a plurality of different spatially constrained emissions. In one embodiment, a scanning laser can be used to produce the spatially constrained emissions. Each RAD 110, 112 can have a known position in the room 104. Thus, a grid can be formed by a scanning pattern of each RAD 110, 112.

For example, as shown by diagram 160, RAD 112 can generate seven different spastically constrained regions or zones, which are labeled A1-A7. Similarly, RAD 110 can produce seven zones as well, which are labeled B1-B7. Thus, a grid is established within the room 104, which divides the room into a series of grids or sectors. Using the grids of illustration 160, person 114 (e.g., Person P1) is positioned in grid A3, B2 and person 115 (e.g., Person P2) is positioned in grid A3, B2.

To make use of this optical grid, a set of sensors 176 must exist, which are responsive to optical signals 172 emitted from the RADs 110, 112. Further, each sensor 176 must be able to determine which zone (A1-A7 or B1-B7) is associated with a detected optical signal 172. Additionally, some computing device (116) for tracking person 114, 115 locations must be provided with information derived from the detected optical signals 172, where the computing device (116) can process the signals to determine relative positions of people 114, 115.

Turning to illustration 170, each room association device 110, 112 can emit an optical signal 172, which is detectable by a series of sensors 176 worn by people 114,115 in the room 104. The optical signal 172 can be in a spectrum that is not able to penetrate walls 106 of the room 104. Additionally, the signal 172 can include encoded data 173. The sensors 176, a computing device 178 (e.g., processor) and transmitter 180 can together be referred to as a force-on-force device 179.

In one embodiment, measures can be taken to minimize interference caused by concurrently receiving signals 172 from different RADs 110, 112 in a room 104. For example, emissions can be timed from each RAD 110, 112 so that only one signal 172 is being emitted from a RAD 110, 112 in a room 104 at any one time. In another example, signals 172 from each RAD 110, 112 can be adjusted to have a unique characteristic (phase, spectrum, modulation scheme) that can be used to distinguish which RAD 110, 112 an optical signal 172 is from.

Each person 114, 115 can wear or be communicatively linked to device 178 which includes a processor able to execute predefined instructions stored in memory which encode logic. The logic can permit the force-on-force device to determine and respond to defined events. One such event can include the sensing of the signal 172 by sensors 176. Upon receiving signal 172, device 178 can decode and process data 173. After processing, device 178 can encode additional data 175 within a signal 174 conveyed from transmitter 180. The signal 174 can be a RF signal or the equivalent (e.g., terahertz) signal. In one embodiment, signal 174 can be designed to penetrate walls 106 and/or to have a wide enough dispersal to ensure that at least one RAD 110, 112 receives the signal 174. The RADs 110, 112 can communicate received data 175 to one another and to one or more remotely located devices 116 (e.g., a central control device or a simulation manager) over a network 140.

In one embodiment, the RADs 110, 112 in a room 104 can have substantially identical functionality. In another embodiment, one RAD 110 in the room 104 can be a room RAD where the other RAD(s) in the room 104 can be limited RADs, which are also referred to as Room Support Devices (RSDs). Each room RAD can be capable of receiving signal 174 and communicating with computing device 116 over network 140. Each RSD can have their functionality limited to optical emissions (emitting signal 172). That is, since a single RAD (e.g., room RAD) can handle the reception and transmission of room specific data, the RSDs in the room need not handle these functions. In one implementation, the RSDs can possess the features of the room RAD, yet have multiple ones of these features disabled. Redundancy and resilience can be achieved by selectively enabling the otherwise disabled features, should a failure occur in the room RAD. In another implementation, the RSDs may be more rudimentary devices lacking features, which are present in the room RAD.

Facing direction of a person 114, 115 in a room 105 can be determined by using more than one sensor 176. The sensors 176 should move when a head of the person 114, 115 moves. One way to accomplish this it to attach the sensors 176 to different portions of a helmet worn by a person 114, 115. It should be appreciated that a computed facing direction can be used to imply a direction of fire of a simulation weapon carried by the user 114, 115. That is, it can be assumed that a weapon is being fired in the same direction that a person 114, 115 carrying and firing a weapon is looking and/or facing.

Measures can be taken to increase an accuracy of the facing direction. For example, in one embodiment, pupil movements of a person 114, 115 can be monitored via sensors embedded in eyeglasses worn by a user 114, 115. Pupil movement determination can be cooperatively combined with a position of a head (e.g., facing direction) to accurately determine a user's line-of-sight. In some embodiments, facing direction alone is sufficient to estimate line-of-sight. Table 120 shows facing directions computed and maintained for people 114, 115 in room 104. As shown, the facing directions are recorded for a single plane, such as a horizontal plane. The shown facing directions are recorded as an angle from a reference vector established for the room 104.

It should be appreciated that more than two RADs 110, 112 can be present in each room 104 for many reasons and that the disclosure is not to be construed as limited in this regard. For example, three RADs can be utilized in a single room to create a three dimensional grid of the room, which can be especially significant in multi-story rooms, rooms having staircases, overhead walkways, and the like.

Figure 2:
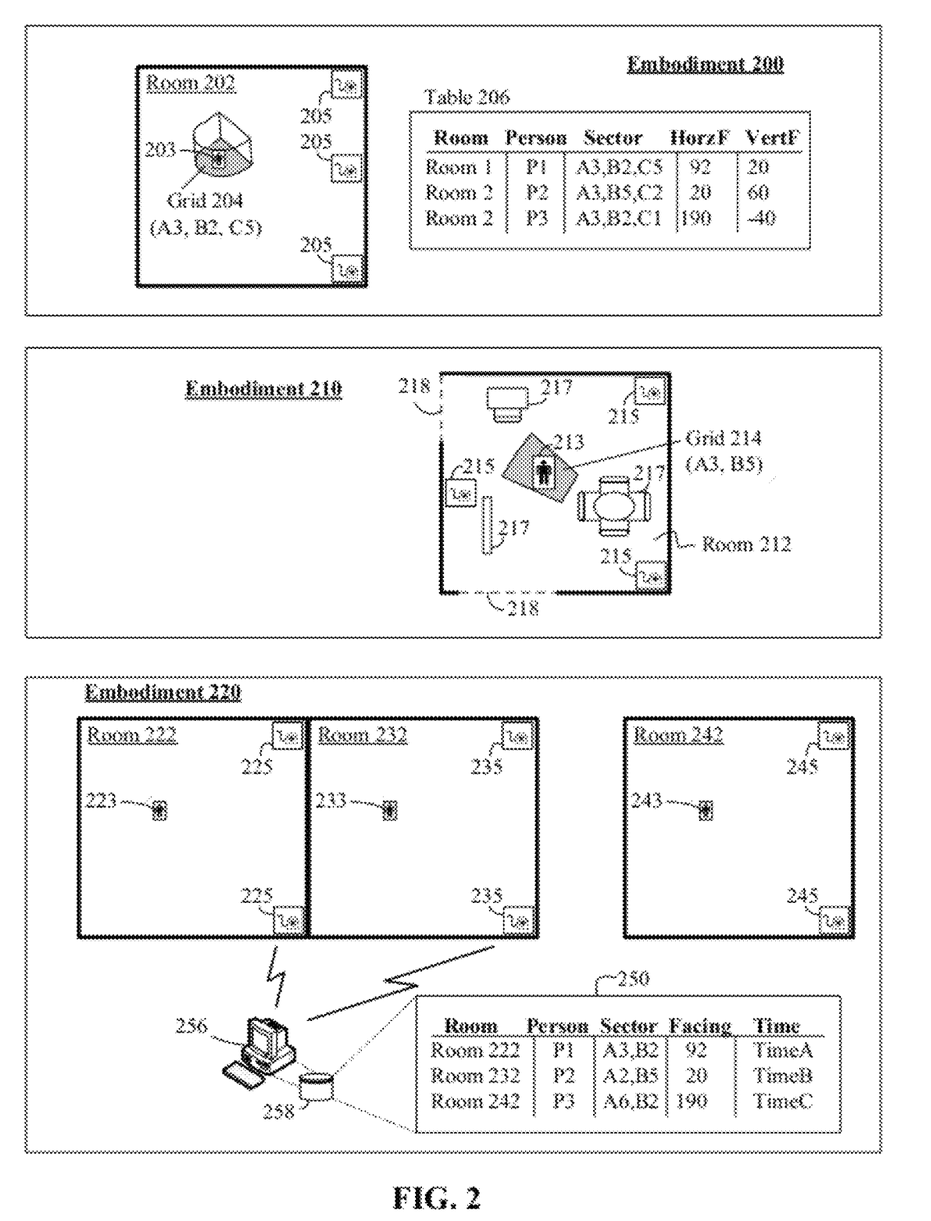
FIG. 2 shows embodiments for RADs in accordance with an embodiment of the inventive arrangements associated herein.

Embodiment 200 of FIG. 2 shows such an arrangement. Specifically, a three dimensional grid 204 position (A3, B2, C5) for a person 203 in room 202 is determined using three RADs 205. Table 206 shows that each recorded sector associated with a person's location can have three components, one from each scanned region (or zone) produced by each RAD 205. Additionally, facing direction can include a horizontal facing component (HorzF) representing a facing direction relative to a horizontal plane and a defined reference vector as well as a vertical component (VertF), which represents a vertical angle of a person's 203 head relative to a reference vector.

Further, in contemplated embodiments, use of more than two RADs 110, 112 can be beneficial to increase accuracy (e.g., create a tighter grid) to minimize scanning delay (e.g., increasing responsiveness), and to compensate for in-room obstacles that block line-of-sight between a RAD 110, 112 and a person 114, 115.

Embodiment 210 of FIG. 2 shows a room 212, where three RADs 215 are utilized to determine a two dimensional grid 214 position (A3, B5, C5) for a person 213. The room 212 can contain a number of obstacles 217, which result in "dead" spots in the room 212 where optical signals emitted from one or more of the RADs 215 are obscured. Shown obstacles 217 include tables, desks, bookshelves, and the like. A redundant RAD 215 can be positioned to cover other RADs when a blind spot is encountered. Thus, the three different regional values (A3, B5, C5) are mapped to a two dimensional position with redundancies to compensate for obstructions 217 and/or to increase accuracy. Any number of redundant RADs 215 can be utilized, which will vary from implementation to implementation and which depend on environmental and simulation specific factors.

Embodiment 210 also shows that walls of a room 212 can include missing segments 218. Further, although rooms (e.g., room 104, 202, 212, 222, 232, 242) are shown as rectangular for simplicity of expression, they are not to be construed as limited in this regard. Embodiments exist where rooms are oval, polygonal, or have any shape or number of walls.

Embodiment 222 shows a set of rooms 222, 232, 242 each including two or more RADs 225, 235, 245. A location and facing direction of people 223, 233, 243 in the rooms 222, 232, 242 can be determined, as previously detailed. The RADs 225, 235, 245 can be communicatively linked to each other and to computing device 256 connected to data store 258. Location and facing direction of the people 222, 232, 242 can be maintained in table 250, which also records a time.

The time is important because events in the rooms 222, 232, 242 can occur asynchronously with one another. That is, an overall simulation exercise can be conducted during which people 223, 233, 243 enter and leave the rooms 222, 232, 242. These rooms 222, 232, 242 can have a different effective time horizon from each other and/or from other simulation areas. For example, room 222 can have an effective time one minute earlier than room 242, and ten seconds later than room 232. Use of different effective time horizons can be beneficial for handling processing loads, which would otherwise overly task computing resources, such as resources of device 256.

One challenge with use of different time horizons in rooms 222, 232, 242 is that time must be reconciled for events occurring within one room, which potentially affect another room. One such event is a firing of an explosive ordinance from one room, which may produce an explosion in an adjacent room.

Embodiment 220 can handle extra-room events, such as explosions, without utilizing additional hardware or components other than those shown. That is, in each room a location of each person is known, as is each person's facing direction. When a person 223, 233, 243 fires a weapon, a worn force-on-force device can transmit firing data to computing device 256. The firing device can compute a blast radius for the fired ordinance (in the facing direction of the person firing) based on the firing data. When a potential target (person having a known position) in an adjacent room would be affected by the blast radius, information to this effect can be transmitted from device 256 to the RAD of the room. The RAD can then transmit suitable information to the force-on-force device of the potential target. For example, if a person would be killed or wounded by the blast radius, the RAD can transmit a kill/wound signal that is received by the potential targets force-on-force device.

As shown in FIG. 1, the computing device 116 (or device 256) can be a central control device hosting executable computer program products (e.g., software, firmware, etc.) for managing a simulation. Device 116 can provide a user interface 130 for viewing, modifying, and otherwise permitting a set of one or more users to interact with computing device 116 and computer program products hosted thereon.

A room (e.g., room 104, 202, 212, 222, 232, 242) as used herein is a fixed geographic region covered by an optical grid established by a combination of two or more RADs and RSDs. A room can be a roofed enclosure, such as a room of a building or a bay of a warehouse. When a room is a roofed enclosure, it need not have four walls. For example, a car port or a wall-less overhang can be considered a room for purpose of this disclosure. Additionally, a room need not be roofed, but may be any semi-enclosed space having definable boundaries. For example, a canyon bottom where terrain features for a depression can be a room for purposes of this disclosure. Similarly, a forest clearing (having "walls" formed by trees, vegetation, and other visual obscuring objects) can be included in a definition of a "room" in context of this disclosure.

A wall (e.g., wall 106) as defined herein is a relatively fixed visual obscuring object, which inhibits a passage of optical signals transmitted by a RAD or a RSD. In one embodiment, a wall can be an approximately vertical structure that defines boundaries of a structure, but it is not restricted to such. In one embodiment, the wall can be any relatively static visual obscuring object, where relatively static means that the wall has a fixed geographic position. The visual obscuring object can further be a movable object (e.g., non-fixed asset), such as a tank, semi truck carrier, a tent, or other semi-stationary object. A wall for purposes of this disclosure can also include a wall of smoke, a wall of fire, a canyon wall, and the like. Each of these walls can impede visual line-of-sight and can correspondingly block optical signals transmitted by RADs or RSDs.

A person (e.g., person 114, 115. 203, 213, 223, 233, 243) as defined herein can be a human being. A person can also be any other living entity (e.g., an animal) or object (e.g., truck, plane, robot, drone, target, etc.) wearing or including a force-on-force device (e.g., device 179).

Network 140 can include any hardware, software and firmware necessary to convey data encoded within carrier waves. Data can be contained within analog or digital signals and conveyed though data or voice channels. Network 140 can include local components and data pathways necessary for communications to be exchanged among computing device components and between integrated device components and peripheral devices. Network 140 can also include network equipment, such as routers, data lines, hubs, and intermediary servers which together form a data network such as the Internet. Network 140 can also include circuit-based communication components and mobile communication components, such as telephony switches, modems, cellular communication towers, and the like. Network 140 can include line based and/or wireless communication pathways.

Data stores 118, 258 can be a physical or virtual storage space configured to store digital information. Data stores 118, 258 can be storage mediums physically implemented within any type of hardware including, but not limited to, a magnetic disk, an optical disk, a semiconductor memory, a digitally encoded plastic memory, a holographic memory, or any other recording medium. Data stores 118, 258 can be a stand-alone storage unit as well as a storage unit formed from a plurality of physical devices. Additionally, information can be stored within data stores 118, 258 in a variety of manners. For example, information can be stored within a database structure or can be stored within one or more files of a file storage system, where each file may or may not be indexed for information searching purposes. Further, data stores 118, 258 can utilize one or more encryption mechanisms to protect stored information from unauthorized access.

Optical signal 172 as defined herein can be a signal projected by a RAD or RSD which is able to be focused in a set of spatially constrained regions or zones. Optical signals 172 can be in the near infrared spectrum as well as the visible light spectrum. In various embodiments, the optical signal 172 can have an electromagnetic wavelength above the 400 nm and below 3000 nm, which is an expansive EM range (over traditional definitions of optical signals). In many embodiments, it can be advantageous for the signals 172 to be non-visible to the human eye, which means the wavelength will be above approx 700 nm. In other embodiments, it can be advantageous for signal 172 to be MILES compliant, which means the wavelength will be approximately (+ or −50 nm) 904 nm. Wavelengths approximately (+ or −50 nm) at 1500 nm can be advantageous as they are known to be safe to an unshielded human eye.

Radio Frequency (RF) signal 174 as defined herein can be a data carrying signals which are able to penetrate walls. Signal 174 has a longer wavelength than signal 172. Specifically, signal 174 falls within the radio frequency spectrum. In various embodiments, any of a variety of RF band can be used, which include extremely low frequency (ELF) (e.g., wavelength of 100,000 km-10,000 km), super low frequency (SLF) (e.g., wavelength of 10,000 km-1000 km), ultra low frequency (ULF) (e.g., wavelength of 1000 km-100 km), very low frequency (VLF) (e.g., wavelength of 100 km-10 km), low frequency (LF) (e.g., wavelength of 10 km-1 km), medium frequency (MF) (e.g., wavelength of 1 km-100 m), high frequency (HF) (e.g., wavelength of 100 m-10 m), very high frequency (VHF) (e.g., wavelength of 10 m-1 m), ultra high frequency (UHF) (e.g., wavelength of 1 m-100 mm); super high frequency (SHF) (e.g., wavelength of 100 mm-10 mm); extremely high frequency (EHF) (e.g., wavelength of 10 mm-1 mm), and terahertz frequency (e.g., wavelength of 1 mm-90 um) can be used. It can be advantageous, in some embodiments, to constrain signal 174 to the ultra high frequency range, as that range is standard for mobile phone, wireless LAN, BLUETOOTH, two-way radio, GPS, and other standard communication protocols. In various embodiments, signal 174 and information 175 carried therein will be explicitly formed to conform to a standardized communication protocol, such as one of the IEEE 802.11 based family of standards, BLUETOOTH, ZIGBEE, WIRELESS USB, etc.

Figure 3:
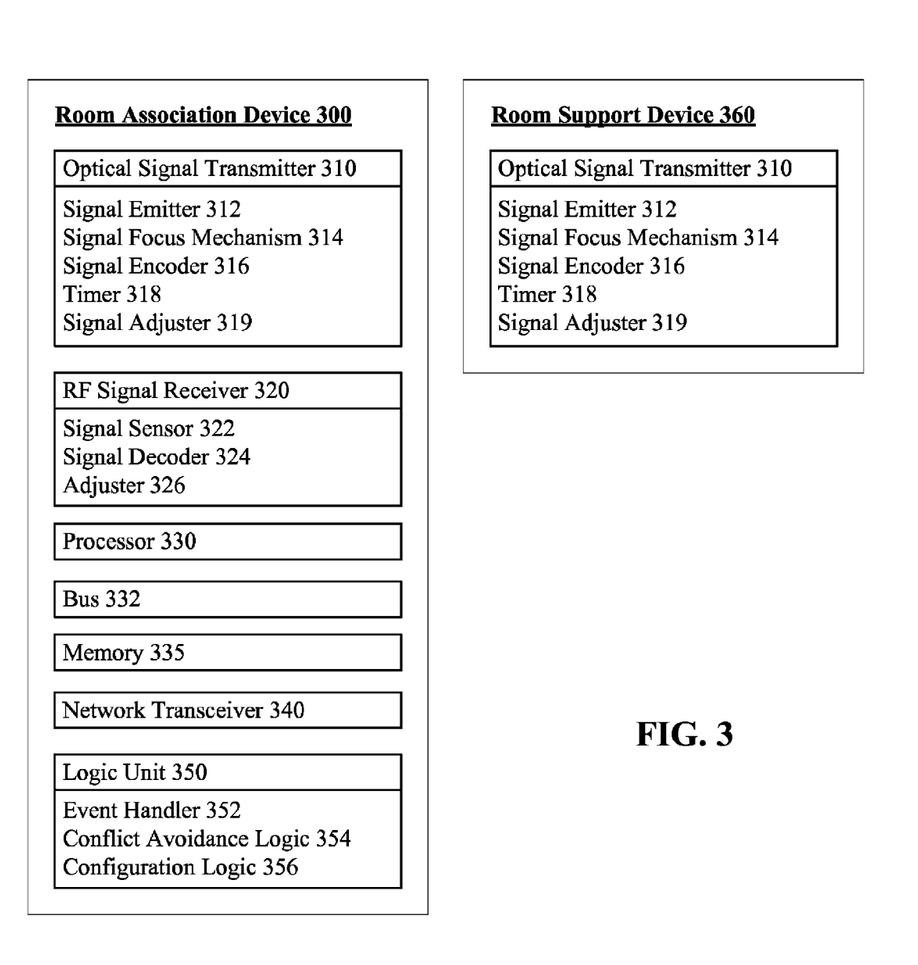
FIG. 3 is a schematic diagram of a RAD in accordance with an embodiment of the inventive arrangements disclosed here.

FIG. 3 is a schematic diagram of a Room Association Device (RAD) 300 in accordance with an embodiment of the inventive arrangements disclosed here. RAD 300 is one embodiment for device 110, 112, 205, 215, 225, 235, and/or 245 shown in FIG. 1 or FIG. 2. Room support device (RSD) 360 can be a minimized version of a RAD 300 having an optical signal transmitter 310, but lacking one or more of an RF signal receiver 320, a processor 330, a memory 335, a network transceiver 340, and logic unit 350, which are components included in RAD 300. RSD 360 can optionally replace all in-room RADs but one and still achieve the optical based position determinations described herein.

RAD 300 is a device that helps manage activities of a simulation room. For example, when a person enters a room, RAD 300 can detect this event and inform a remotely located centralized computer (e.g., a simulation manager). Thus, RAD 300 can minimize communication traffic and function as a centralized "hub" for all data exchanges involving a specific room. This provides multiple opportunities that would otherwise be impossible. For example, it permits a differential in time-horizons between intra-room and extra-room events (e.g., room "actions" can be a known time out-of-synch with external events, without negatively affecting a simulation experience in an appreciable manner). Use of RADs 300 generally permits a segmentation of simulation data on a per-room basis, which permits computing resources to prioritize processing requirements and helps minimize processing lag from input overload, which is common in simulation exercises of moderate to large size.

Additionally, use of RAD 300 minimizes transmission power required of on-person transmitters (e.g., transmitters on force-on-force devices), which conserves battery life of on-person devices. That is, an on-person device can be shifted to a local transmission (or room transmission) mode, as opposed to having to project transmissions to a centralized receiver which could be miles away. Instead, transmissions only need to be sent to the RAD 300 which selectively retransmits these transmissions to a more remote device where the retransmissions are tagged with a room-id unique to the RAD 300. In one embodiment, the RAD device 300 itself can perform rudimentary (or even advanced depending on embodiments) processing of received input. This processing can significantly reduce load on a more centralized computing device (e.g., device 116).

As noted, the RSD 360 can be a minimized version of the RAD 300. In each room, only one receiving (and processing) device is needed, yet at least two devices that emit optical transmissions are needed, otherwise an optical grid could not be formed which is used to locate a position of an in-room person. The RSD 360 contains the same optical signal transmitter 310 as the RAD 300. That is, an optical sensor receiving an optical emission is unaware (and unconcerned) with whether optical signals originated from RAD 300 or RSD 360. In one embodiment, RSD 360 can be implemented as a discrete device that operates independent of RAD 300. In another embodiment, RSD 360 can be directly linked to RAD 300 and can be controlled by RAD 300. In the latter embodiment, the RSD 360 may lack internal logic 350 (e.g., an executable computer program product that controls device 360 functions), as it may utilize the logic 350 of the RAD 300 to which it is attached.

The optical signal transmitter 310 is a component able to transmit focused energy (e.g., capable of producing optical signal 172) at a wavelength that is unable to penetrate room walls. As used herein, optical transmissions include the near infrared spectrum as well as the visible light spectrum, as described. In one embodiment, the wavelength can be MILES compliant, which is currently approximately 904 nm. Other wavelengths can be advantageously used. For example, longer wavelengths can be used in environments that may obstruct shorter wavelength transmissions (e.g., longer wavelengths can better operate in smoky rooms common when pyrotechnics are used for weapon effect simulation or when in-room fires are being simulated).

Actual hardware used for the optical signal transmitter 310 can vary from implementation to implementation so long as a focused beam (spatially constrained) of transmitted energy at a designated wavelength range can be generated. In one embodiment, transmitter 310 can be a scanning laser. Transmitter 310 is not to be limited in this regard, however, and light emitting diodes (LED), and other emission sources can also be used in different contemplated embodiments.

Transmitter 310 can include a signal emitter 312, a signal focus mechanism 314, a signal encoder 316, a timer 318, and a signal adjuster 319. The signal emitter 312 can be the component that generates the optical emissions produced by transmitter 310. The signal focus mechanism 314 can include a set of mirrors, direction altering actuators, or other emission shaping/directing components, which alter a path, position, or shape of produced optical transmissions. The signal focus mechanism 314 can also include a repositioning mechanism that "moves" the emissions from sector to sector of a room.

The signal encoder 316 can digitally encode data within emissions. Encoder 316 can utilize pulse code modulation (PCM), phase modulation, or other encoding scheme. In a MILES compliant system PCM is currently used.

The timer 318 can include a timing signal, which can be optionally synchronized with timers 318 of other RADs 300, RSDs 360, and/or centralized computing devices (e.g., device 116). In one embodiment, intra-room time synchronizations (using timer 318) can ensure that optical transmissions from transmitters 310 in a given room are non-conflicting with one another.

Signal adjuster 319 can be a component that alters characteristic of transmitter 310 is a configurable manner. For example, adjuster 319 can be used to alter a wavelength of produced energy within a defined range. Adjuster 319 can also change timing (timer 318 adjustment) of emissions, a beam shape (mechanism 314 adjustment), a quantity of beam sectors, a coverage area per sector (mechanism 314 adjustment), a coverage angle for the RAD 300, and other such properties. Adjustor 319 can be implemented to have manual adjustment switches or electronically implemented ones (which can respond to commands issued within digitally encoded messages).

The RF signal receiver 320 can be a component able to detect transmissions able to pass through walls of a room and/or through other visual obstructions. The RF signal receiver 320 can be capable of producing signal 174. The RF signal receiver 320 can conform to any of a variety of known protocols, such as conforming to BLUETOOTH, ZIGBEE, WIRELESS USB, WIFI, or other such standards.

The receiver 320 can include a signal sensor 322, a signal decoder 324, and a signal adjuster 326. The sensor 322 can include a set of antennas (directional or otherwise) designed to capture energy from an RF source within a defined range. Signal decoder 324 can decode content that is digitally encrypted in an RF carrier wave detected by sensor 322. Decoder 324 can convert this data into another digitally encoded for form, such as a form stored in memory 355 and able to be interpreted by processor 330. Any of a variety of decoding technique can be utilized, which includes decoding content by time, phase, frequency, and combinations thereof.

Signal adjuster 326 can be used to adjust settings of sensor 322 and/or decoder 324. For example, the adjustor 326 can be used to limit receiver 320 to responding to signals within a configurable frequency range.

In one embodiment, receiver 320 can be a transceiver that also transmits data digitally encoded in RF carrier signals to other RADs 300, centralized computing devices, or other network elements. In such an embodiment, the transceiver (including receiver 320) can be a component of network transceiver 340. The transceiver 340 can also be a separate component, which uses different protocols from the receiver 320. For example, receiver 320 can be a BLUETOOTH compliant receiver, while transceiver 340 can be a WIFI (referring to being compliant to any of the IEEE 802.11 family of protocols) compliant wireless transceiver. Transceiver 340 can also be implemented as a line-based transceiver which directly connects to a CAT 5 or CAT 6 Ethernet cable (or other physical communication line). In one embodiment, transceiver 340 can connect RAD 300 to a public or private internet protocol (IP) network, such as a TCP/IP compliant network.

Processor 330, memory 335, transceiver 340, transmitter 310, receiver 320, and other such components can be interconnected via bus 332. The processor 330 can be any microprocessor able to process computer program product instructions. Memory 335 can be a volatile or non-volatile memory, which is a storage medium capable of maintaining digitally encoding data. The bus 332 can be a communication linkage for conveying digitally encoded data among components that it connects.

A logic unit 350 can comprise one or more computer program products, which are storable in memory 335 and able to be executed by processor 330. Computer program products include software, firmware, and circuit-expressed logic.

Logic unit 350 can include event handler 352, conflict avoidance logic 354, and configuration logic 356.

Event handler 352 permits device 300 to monitor a set of events and to trigger programmatic actions whenever an event occurrence is detected. Events can be based upon content contained in messages decoded by decoder 324 or contained in signals received by transceiver 340. Events can also be based on content-independent occurrences, such as a detection of a signal by sensor 322 or transceiver 340. For example, event handler 352 can detect a firing event occurring within one room, which triggers programmatic actions to determine if an explosive effect is to be triggered in an adjacent room (e.g., based upon ordinance off a fired weapon, a facing direction and location of a person firing a weapon, and other such conditions). Events handled by handler 352 can be of an arbitrary complexity so long as logic 350 can be defined for the events and so long as input driving the events is able to be ascertained.

Conflict avoidance logic 354 can be logic used to prevent optical signals emitted into a common room from interfering with each other. The logic 354 can be used to implement changes in the signal adjuster 319 in one embodiment of the disclosure. Logic 354 can further include digital signal processing (DSP) operations implemented to distinguish signal transmissions from each other using power differences, ricochet/reflection adjustment algorithms, and the like.

Configuration logic 356 permits an authorized administrator/user to adjust performance characteristics of a device 300 or 360 as well as to adjust logic of handler 352 and conflict avoidance logic unit 354. Logic 356 can be adjustable by manipulating configurable hardware (e.g., switches or other electronic path altering artifacts) or by changing software/firmware settings. In one embodiment, these adjustments can be made remotely using commands received via the network transceiver 340.

Figure 4:
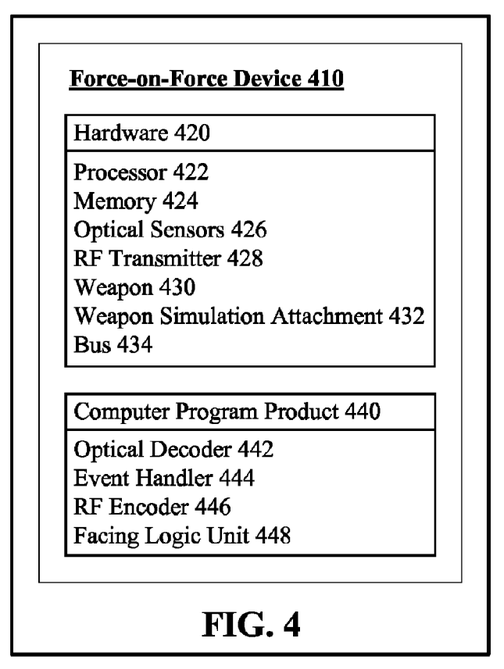
FIG. 4 is a schematic diagram of a personal force-on-force device in accordance with an embodiment of the inventive arrangements disclosed herein.

FIG. 4 is a schematic diagram of a personal force-on-force device 410 in accordance with an embodiment of the inventive arrangements disclosed herein. Device 410 is not strictly limited to being a force-on-force device, but can be on-person device able to detect optical signals (e.g., signal 172) and respond with RF signals (e.g., signal 174). In one embodiment, device 410 can be a device that detects optical signals emitted from a RAD or from a RSD, that can determine person specific events (e.g., firing a weapon), and that can communicate detected optical signals and person specific events to a RAD via an RF transmitter 428. This transmitted data can then be used to triangulate the person's location in a room and facing position. It can also be used to determine if a firing event has occurred that will have an effect outside boundaries of a room, in which case actions to effectuate the extra-room actions can be initiated.

In one embodiment, force-on-force device 410 can be a MILES compliant device. Although device 410 is discussed as being attached to a person, the disclosure is not so limited. In other configurations, force-on-force 410 can be attached to a vehicle, a weapon, an ordinance, an in-room movable (a target or a robot, for example), and the like. Device 410 need not include a global positioning system (GPS) or other location tracking component to assist in determining a position of an associated user. In one configuration, the new ability of the force-on-force device 410 can be implemented as a software/firmware upgrade, which does not require hardware modifications be made to legacy equipment. One exception to this can be a modification of the sensors 426, should facing direction computations be implemented and should the "baseline" version of device 410 lack sensors that adjust their position with a wearer's head position.

The force-on-force device 410 can include hardware 420 and one or more computer program products 440. The hardware 440 can include a processor 422 that can be any microprocessor able to process computer program product instructions of products 440. Memory 424 can be a volatile or non-volatile memory, which is a storage medium capable of maintaining digitally encoding data. The one or more computer program products 440 can be storable in memory 424 and can include an optical decoder 442, an event handler 444, an RF encoder 446, facing logic unit 448, and the like. In one embodiment, hardware components 422-424 and products 440 can for a personal computing device (e.g., device 178 of embodiment 170), which is linked to other components (426-432), which are effectively linked peripherals. These peripherals can provide input/output which drives processing actions.

Hardware 420 can include optical sensors 426, RF transmitter 428, weapon 430, weapon simulation attachment 432, and other such components. Hardware 420 components 422-432 can be communicatively linked to each other via bus 434. The optical sensor 426 can be any sensors able to detect energy emitted from transmitter 310, such as optical signal 172. The sensors 426 can be optionally filtered to only detect energy within a narrow band, such as a band for which the transmitters 310 are configured. In a MILES compliant embodiment, this band can be centered at 904 Ms (e.g., 904+/−50 ns). Multiple sensors 426 can be utilized where each is uniquely identified, such as with a sensor specific identifier. Further, sensors 426 can shift position as a wearer's head changes. Thus, sensors 426 can be used to determine a person's facing direction relative to an emission source (e.g., RAD or RSD). In one embodiment, sensors 426 can be helmet mounted, as shown by embodiment 170, where a set of three sensors are positioned in read-center, front-right, and front-left positions relative to a wearer's head. Other quantities and positions of sensors 426 can be utilized and the disclosure is not to be construed as limited in this regard.

The weapon 430 and weapon simulation attachment 432 can be carried and fired. Firing of weapons can typically cause the attachment 432 to emit a laser signal, which other force-on-force people/components detect. Here, the facing direction, which is automatically computed, is being used to estimate or infer a direction of a fired weapon 430, meaning an assumption is being asserted that a user fires a weapon in a direction in which he/she faces. The firing event and facing direction is conveyed to a remote device (RAD, for example), where the firing data and trajectory can be passed to other devices, which can even operate on opposite sides of an optical barrier, such as a well (for example embodiment 220 describes this situation).

The RF transmitter 428 can be a component that transmits signals that include digitally encoded data, where these signals are compatible of being received by RF signal receiver 320. The RF transmitter 428 can generate RF signal 174. In one embodiment, transmitter 428 can be a MILES compliant RF transmitter. The transmitter 428 can also be a short distance transmitter, designed to consume a minimum amount of power since while in a room transmissions only need to be conveyed to a proximately located RAD. Towards this end, a transmitter 428 can have two or more different modes, which correspond to varying power output levels. Alternatively, transmitter 428 can be a component distinct from and implemented separately from a longer range transmitter (not shown), which is part of the force-on-force device 410.

Turning to computer program products 440, optical decoder 442 is a component used to extract information encoded within optical signals detected by sensors 426. An identifier for an emission source and a scanning sector, for example, is expected to be encoded within the optical signals, which decoder 442 can decode. Event handler 444 can perform a set of programmatic actions responsive to a receipt of previously configured inputs. For example, when an optical transmission is detected by a sensor 426, event handler 444 can fire programs, which provide a message transmitted by transmitter 428.

The RF encoder 446 is capable of digitally encoding information within the carrier signals transmitted by the RF transmitter 428. The encoding technique can be a MILES compliant one or can be one compliant to any of a variety of standards. The encoder 446 can either encrypt the transmitted data or can transmit the data in the clear.

The facing unit logic 448 can be included on device 410 or can be remotely located (e.g., on computing device 116 or RAD 110). Facing logic unit 448 can determine a facing direction relative to an emission source based upon detected optical signals.

Figure 5:
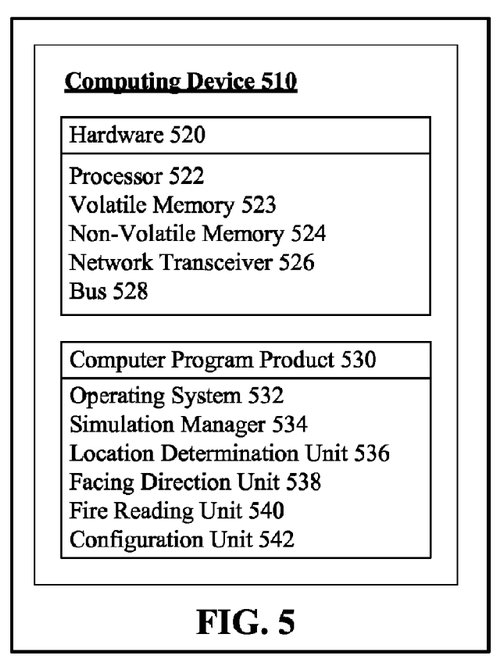
FIG. 5 is a schematic diagram of a computing device for centrally managing force-on-force operations in accordance with an embodiment of the inventive arrangements disclosed herein.

FIG. 5 is a schematic diagram of a computing device 510 for centrally managing force-on-force operations in accordance with an embodiment of the inventive arrangements disclosed herein. The device 510 can be one embodiment of device 116 shown in FIG. 1. Device 510 can be implemented as a single physical device or a set of two or more interconnected physical devices interacting with one another to perform the functions expressed herein. For example, device 510 can be a cluster of devices having inherent redundancies to ensure continuous operation even should any one component fail. In another embodiment, the device 510 can be a set of devices forming a computing device having a service oriented architecture (SOA). The device 510 can include a set of devices, such as a back-end set of servers, a Web server for distributing content of the backend, and the like. In yet another example, device 510 can be implemented in a scaled fashion where a localized processing of a set of rooms occurs within a single device, then results from that processing are conveyed to a centralized device 510 which coordinates data from all the rooms involved in a simulation as well as coordinates extra-room events. A scaled implementation can be particularly advantageous for large-scale simulation control and in situations where different time horizons (rooms are out of synch time-wise with other rooms and with other simulation activity) exist during a simulation.

Device 510 can include hardware 520 and one or more computer program products 530. The hardware 520 can include a processor 522 that can be any microprocessor able to process computer program product instructions of products 530. Hardware 520 can also include a volatile 523 and non-volatile memory 524, which are each storage mediums capable of maintaining digitally encoding data. A network transceiver 526 can also be included which connects computing device 510 to a network (e.g., network 140) to which one or more remotely located devices (RAD devices, for example) are also connected. The processor 522, memory 523, 524, and network transceiver 526 can be connected to each other via bus 528.

The computer program products 530 can be digitally encoded in memory 523 and/or memory 524. In one embodiment, an operating system 532 can be included upon which other computer program products 526-542 execute. The operating system 532 can be a desktop operating system 532 (e.g., LINUX, SUNOS, WINDOWS, etc.), a server operating system or a mainframe operating system (Z/os, General Comprehensive Operating System (GCOS), etc.). In one embodiment, the operating system can be a virtualized operating system that operates at a layer of abstraction above the hardware of the underlying device 510 and that may operate at a layer of abstraction over an operating system executing upon a device 510. A JAVA 2 Enterprise Edition (J2EE) application server is one example of a virtualized operating system. Others include VMWARE ESX, VMWARE WORKSTATION, Xen, and the like. In another embodiment, the computing device 510 can be a special purpose device in which one or one of the computer program products 524-542 execute directly above the hardware 520 without the existence of an intervening OS layer being imposed in between. Products 536-542 can be components of simulation manager 524 or can be implemented separately.

The simulation manager 524 can create a virtualized environment showing personnel position in any monitored (by a RAD) room. Simulation manager 524 can be used to analyze activities occurring in a simulation in real-time, near-real time, or after an appreciable delay—depending on implementation choices utilized. In one embodiment, the simulation manager 524 can include a communication application for selectively communicating (via voice, text, etc.) with any simulation participants. The simulation manager 524 can also be used to trigger simulation events, such as to revive a "killed" simulation participant, to "kill" a simulation participant who is otherwise alive, to enable/disable targets and/or automated firing solutions, to actuate weapons simulation effects (WSE) during a simulation, and the like.

The location determination unit 536 can determine a relative position of a user within a room. In one embodiment, the relative position can be expressed in terms of a grid (e.g., being in Sector A3, B2 of a gridded room). In another embodiment, a position can be expressed as a position from a known reference point within a room. Positions determined by unit 536 can be of varying accuracy, depending on a size/nature of zones established by the RADs and RSDs. Two-dimensional or three-dimensional positions can be determined by the unit 536 depending on implementation specifics. The location determination unit 536 can also establish an absolute reference point for a person (e.g., a GPS coordinate) based on a computed relative position and its relationship to a position with a known absolute reference point. Any known triangulation technique can be used by the location determination unit 536 for computing position of a person receiving optical transmissions from known, fixed sources (e.g., RADs and/or RSDs).

It should be appreciated that unit 536 is able to determine relative positions because information pertaining to a zone is transmitted and/or encoded within optical emissions. That is, assuming that a RAD uses a scanning laser, every zone is identified within the encrypted transmission. Given the zone from multiple different optical sources, a position or grid that a receiving device is in can be accurately determined. The unit 536 can optionally supplement data from additional sources to increase an accuracy of position determinations. For example, motion sensors, pressure sensors, etc. can be positioned about a room. Feedback from these sensors can help cover "blind spots" resulting from intra-room visual obstructions. These obstructions can even include dynamic repositioning of people within a room, which will occasionally cause line-of-sight obstructions between in-room people and one or more RAD and RSD.

The facing direction unit 538 can determine a facing direction of a person based at least in part upon which sensors have received optical signals. For example, if a front right signal receives optical signals from RAD A, it can be assumed that the front right signal is within line-of-sight of RAD A. A facing direction computed by unit 538 can be within a single plane, such as a horizontal plane (as shown by table 120). In another embodiment, multiple different facing directions along different planes can be determined by unit 538. For example, a horizontal facing direction and a vertical facing direction can be computed in one contemplated embodiment (as shown by table 206).

It should be appreciated that unit 538 can optionally utilize additional input (other than that obtained from reading optical signals from optical transmitters) to determine facing direction. For example, in one contemplated embodiment, a level sensor can be incorporated on a helmet of a wearer, which can be used to determine a tilt angle (vertical facing direction) of a person's head. Further, eye movement detectors can be implemented to determine if the wearer's eyes are facing the same direction as the wearer's head. Additionally, sensors on a weapon (e.g., weapon 430) and input from the same can help determine a weapon facing direction. Although accuracy of the facing direction (as determined by unit 538) is able to be improved by additional inputs as expressed (and as contemplated in embodiments of the invention) this is not a requirement of the system 500. That is, in many instances (and embodiments) determinations of facing direction based solely on received optical signals from sensors (e.g., sensors 426) is sufficient for accurate determination of facing direction for simulation purposes.

The fire reactive unit 536 can be used to calculate an existence and direction of a weapon fired within a room. Unit 536 can then determine whether the fired weapon penetrates a wall and, if so, what affect this weapon is to have on an opposite side of the wall. Input used by unit 536 can include a type of weapon fired, a type of ordinance fired (data obtained from weapon 430, attachment 432, for example), and the like. An effect of the fired ordinance can then be determined. For example, if the ordinance is explosive, a blast radius can be determined. The blast radius and area of effect can then be mapped to a geographic position, even if that position is obscured by a wall. Signals can be conveyed to simulation participants (via RF signaling from a RAD, for example) proximate to the affected area. For example, if a person in an adjacent room is within a blast radius of a fired explosive ordinance, a kill signal can be sent to a force-on-force device worn by that person. In one embodiment, the unit 540 can implement time-horizon based adjustments to compensate for situations where different simulation rooms are operating asynchronously.

The configuration unit 542 can permit an authorized administrator to change settings of a simulation. These settings can result in a myriad of changes. For example, configuration unit 542 can cause a RAD or RSD to divide a given room into a different (user determined based on input) number of spatially defined sectors. The configuration unit 542 can enable/disable adjacent room blast effects, can adjust optical/RF wavelengths of the transmitters/receivers used herein, and can make other adjustments to a simulation environment.

Figure 6:
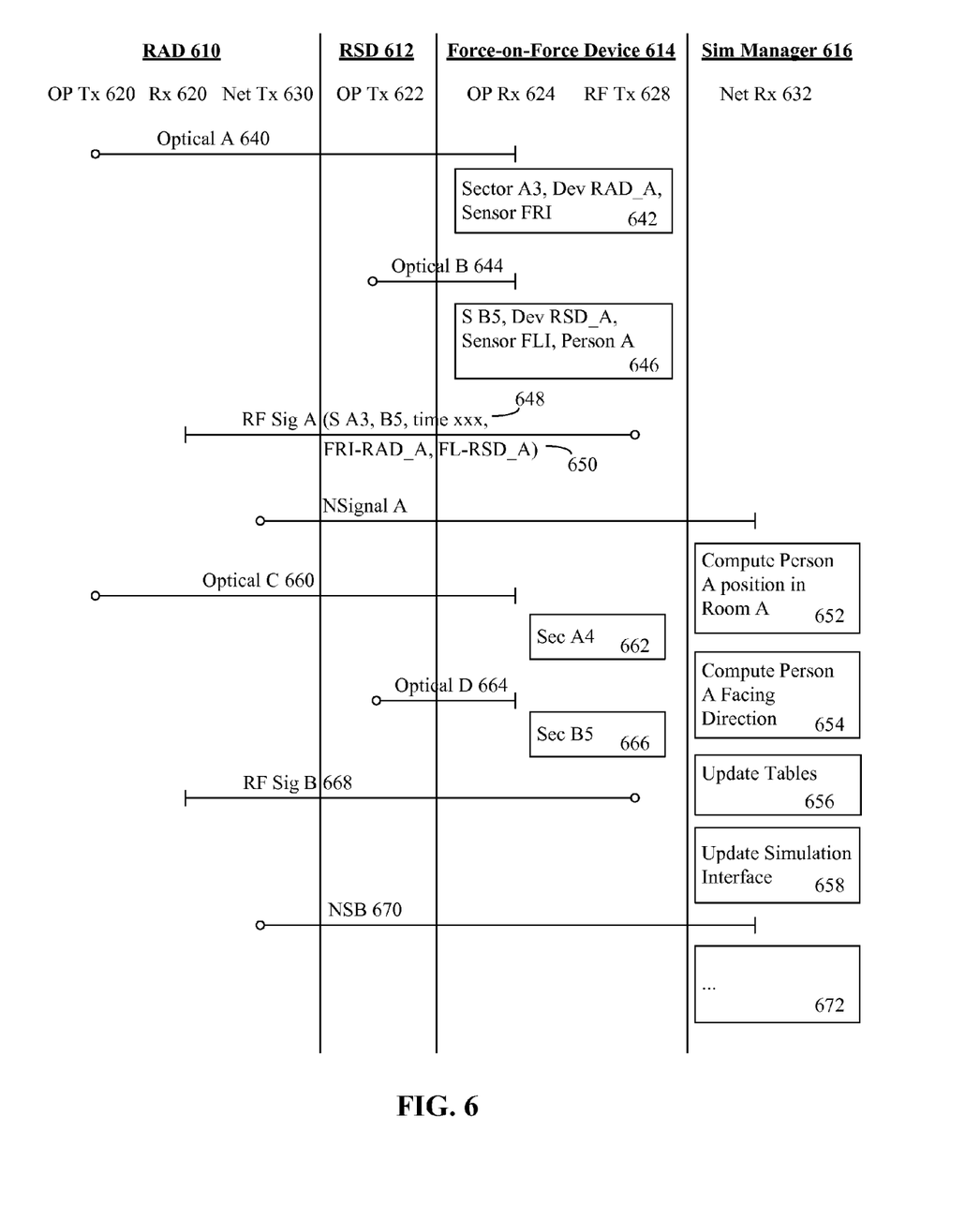
FIG. 6 is a signal flow diagram for determining location and facing direction from detected optical signal transmitted by RADs and/or room support devices (RSDs) in accordance with an embodiment of the inventive arrangements disclosed herein.

FIG. 6 is a signal flow diagram 600 for determining location and facing direction from detected optical signal transmitted by RADs and/or RSDs in accordance with an embodiment of the inventive arrangements disclosed herein. The flow diagram shows signals being conveyed between a RAD 610, a RSD 612, a force-on-force device 614, and a simulation manager 616. The simulation manager 616 refers to a computer program product (e.g., manager 534) as well as hardware that it is hosted upon (e.g., device 510 or device 116). Each device 610-616 can include one or more transmitters and/or receivers which are optical (items 620-624), RF (items 626-628), and other (possibly line-based) (items 630-632) transceivers/receivers as defined herein. Additional transceivers/receivers can be included (not shown). The network transmitter 630 and network receiver 632 can each be implemented as transceivers to permit bidirectional data exchanges.

In diagram 600, Optical Signal A can be transmitted 640 from transmitter 620 to receiver 624. Device 614 can process 642 content encoded in the Optical Signal A to determine that RAD A transmitted the signal, that it was detected with Sensor FR1 (e.g., front right sensor 1), and that the transmission was in Sector A3. Another optical transmission, Optical Signal B can be detected 644 by receiver 624. Processing 646 can discern that Optical Signal B was transmitted from RSD A, that it was detected with Sensor FL1 (e.g., front left sensor 1), and that the transmission was in Sector B5.

The force-on-force device 614 can transmit 648 Radio Frequency Signal A (using transmitter 628) which includes a set of digitally encoded data. This data can indicate device is located in Sector A3, B5 as of Time X (e.g., a time proximate to receipt of Optical Signal A and Optical Signal B). The data can also indicate that Sensor FR1 detected a transmission from RAD A and that Sensor FL1 detected a transmission from RSD B. Further, an identifier of the person, Person A, wearing device 614 can be encoded in RF Signal A. Upon receiving the RF Signal A via receiver 626, RAD 610 can transmit 650 Network Signal A (via transmitter 630), which is received by receiver 632 of the simulation manager 616.

Signal manager 614 can then perform a series of processing actions 652-658 driven by information encoded within Network Signal A. One action 652 can be to compute that Person A is located in a specific position of Room A. The room can be determined since the RAD 610 and RSD 612 are each located in specific rooms, which can be recorded in a mapping table which is referenced during action 652. A facing direction of Person A can then be determined (action 654) based on the received data that Sensor RF1 received a signal from RAD A and that Sensor RL1 received an optical signal from RSD A. During action 656, one or more tables (e.g., table 120, 206, 250) tracking positions and facing directions of simulation participants can be updated. The table updates can cause a simulation interface (e.g., interface 130) to be updated accordingly, as shown by action 658. Any of a variety of programmatic actions can occur responsive to a determination of a position and facing direction of a person and action 658 is provided for exemplary purposes only.

Positioning and facing data of simulation participants can be constantly changing during a simulation. Thus, new communications can be constantly exchanged between devices 612-616, which results in a continuous updating of simulation data. For instance, another signal, Optical Signal C, can be transmitted 660 by transmitter 630 and received by receiver 624. Device 614 can determine 662 that Sensor FR1 is now receiving an optical signal in Sector A4. Optical Signal D can be transmitted 664 and received by receiver 624, which indicates Sensor FL1 is still receiving an optical signal from Sector B4, as determined from processing 666. Device 614 can transmit 668 Radio Frequency Signal B to receiver 626, which contains this updated information. Device 610 can responsively convey Network Signal B 670 containing the updated information to network receiver 632. Content in the Network Signal B can result in further processing actions 672.

It should be noted that flow diagram 600 is for illustrative purposes only and is not to be construed as limiting configurations of the disclosure. For example, diagram 600 shows processing actions 646, 648, 662, and 666 which is an implementation choice not followed in all contemplated embodiments. In one embodiment, for example, all received signals (Optical Signal A-D) can be immediately conveyed back to RAD 610 without any significant processing being performed by device 614. Similarly, in one contemplated embodiment, RAD 610 can perform some processing (not shown) that is indicated as being performed by the simulation manager 616.

The diagrams in FIGS. 1-6 illustrate the architecture, functionality, and operation of possible implementations of systems, methods, and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for determining a position of a mobile device in a room comprising:
    determining via a processor a position within a room of a mobile device based upon sensed optical signals detected by optical sensors connected to the mobile device, where each of the sensed optical signals is geographically focused within a spatially constrained zone, each of the sensed optical signals comprising digitally encoded data indicating an optical source that emitted a corresponding one of the sensed optical signals and a spatially constrained zone of the corresponding one of the sensed optical signals, wherein said determining of the position is based on determining a grid within the room within which the mobile device is located, said grid being defined by overlapping ones of spatially constrained zones that the sensed optical signals are focused within; and
    determining a facing direction within the room of a person wearing said mobile device based upon the sensed optical signals received by the optical sensors and based upon which of the sensors detected the sensed optical signals, wherein the optical sensors move when a head of the person moves.

2. The method of claim 1, wherein the mobile device is a force-on-force device.

3. The method of claim 1, further comprising:
    transmitting a plurality of optical signals from a plurality of different optical transmitters positioned in stationary positions within the room, said transmitted plurality of optical signals comprising said sensed optical signals received by the optical sensors; and
    each of said optical transmitters repetitively transmitting a sequence of a plurality of different spatially constrained zones of emissions, each sequence covering a sequence angle of space in the room relative to the optical transmitter producing the emission, said sequence angle being greater than sixty degrees of space and being less than one-hundred and eighty degrees of space, wherein each spatially constrained zone of each discrete emission of the sequence covers a zone angle of the room relative to the optical transmitter, said zone angle being an angle less than twenty five degrees, wherein each zone angle of emissions in the sequence is different than other zone angles of other emissions in the sequence, wherein a combination of the zone angles results in the sequence angle.

4. The method of claim 1, further comprising:
    receiving at least two different optical signals emitted from different optical sources, each having a stationary position in the room, wherein said at least two different optical signals are two of the sensed optical signals;
    for each of the two different optical signals, decoding via a processor content contained within each of the two different optical signals, said content comprising an indicator of the optical source and the spatially constrained zone of a corresponding one of the two different optical signals;
    querying a tangible storage medium of the mobile device for a unique identifier of the mobile device; and
    transmitting at least one radio frequency signal, comprising digitally encoded RF data, the digitally encoded RF data comprising the indicator of the optical source and the spatially constrained zone of each of the two different optical signals as well as a sensor identifier of a sensor that received a corresponding one of each of the two different optical signals, said RF data also comprising the unique identifier of the mobile device.

5. The method of claim 1, further comprising:
    a remote device remotely located from the room receiving a network transmission over an IP network, wherein said network transmission comprises digitally encoded data, which comprises identifiers for at least two specific ones of the sensed optical signals, wherein said digitally encoded data comprises, for each of the two specific sensed optical signals, data of an identifier of an optical source and a spatially constrained zone that was originally encoded within a corresponding one of the two specific sensed optical signals, said digitally encoded data also comprising a unique identifier of the mobile device; and said remote device processing, via an included processor, the digitally encoded data to perform the determining of the position within the room of the mobile device.

6. A system comprising:
a plurality of room association devices, each comprising an optical signal transmitter, a radio frequency (RF) receiver, and a network transmitter, each of said room association devices for emitting via the optical signal transmitter spatially constrained optical signals along a plurality of different zones, each zone having a zone specific identifier encoded within the optical signal and having an identifier of the room association device encoded within the optical signal;
at least one mobile device comprising a plurality of optical sensors and a radio frequency (RF) transmitter, said mobile device for detecting via one of the optical sensors optical signals emitted from the room association devices, for encoding data detected within the optical signals into at least one radio frequency signal transmitted via the radio frequency transmitter, wherein said radio frequency receiver of each of the room association devices is for receiving radio frequency signals transmitted by the mobile device; and
a computing device comprising a processor and a network receiver, wherein said network transmitter of each of the room association devices is for transmitting data to the computing device, wherein the data transmitted by the room association device is received by the room association device from a mobile device, wherein the processor of the computing device executes a computer program product for determining a position within a room of the mobile device, wherein said determining of the position is based on which of the different zones the mobile device is in, wherein the different zones are the zones defined by spatially constrained optical signals received by the mobile device.

7. The system of claim 6, wherein the processor of the computing device executes a computer program product for determining a facing direction within the room of a person wearing the mobile device based upon optical signals received by the optical sensors of the mobile device and based upon which of the plurality of optical sensors detected the optical signals, wherein the optical sensors of the mobile device move when a head of the person moves.

8. The system of claim 6, wherein each of said optical transmitters of each of said room association devices repetitively transmits a sequence of a plurality of different spatially constrained zones of emissions, each sequence covering a sequence angle of space in the room relative to the optical transmitter producing the emission, said sequence angle being greater than sixty degrees of space and being less than one-hundred and eighty degrees of space, wherein each spatially constrained zone of each discrete emission of the sequence covers a zone angle of the room relative to the optical transmitter, said zone angle being an angle less than twenty five degrees, wherein each zone angle of emissions in the sequence is different than other zone angles of other emissions in the sequence, wherein a combination of the zone angles results in the sequence angle.

9. The system of claim 8, said computing device further comprising:
a volatile memory comprising a tangible storage medium;
a non-volatile memory comprising a tangible storage medium;
a bus for communicatively linking said processor, said volatile memory, said non-volatile memory, and said network receiver; and
at least one computer program product stored in the non-volatile memory and executable by said processor, said at least one computer program product comprising:
a location determination unit configured to determine a position within the room of a person wearing a mobile device based upon the data received via the network receiver;
a facing direction unit configured to determine a facing direction within the room of a person wearing the mobile device based upon the sensed optical signals received by the optical sensors of the mobile device and based upon which of the plurality of sensors of the mobile device detected the sensed optical signals; and
an operating system upon which the location determination unit and said facing unit execute.

10. The system of claim 9, wherein said computer program product further comprises:
a simulation manager configured to manage locations of a plurality of people wearing a plurality of mobile devices that are positioned in a plurality of different rooms, said locations being determined at least in part by computations performed by the location determination unit, and to display positions of the plurality of different people within a graphical user interface, which is dynamically updated during a simulation exercise as locations of the people change.

11. The system of claim 6, said optical signal transmitter of each of said room association devices for emitting optical signals in a plurality of different spatially constrained zones, each optical emission comprising digitally encoded data comprising a unique transmitter key associated with the room association device and a unique sector key that uniquely identifies which of the different spatially constrained zones is associated with each of the optical signals from a corresponding one of the room association devices, each of said room association devices comprising:
a processor for processing programmatic instructions;
a memory comprising a tangible storage medium;
a bus for communicatively linking said processor, said memory, said optical signal transmitter, said RF signal receiver, and said network transceiver; and
a logic unit comprising at least one computer program product stored in said memory and executable by said processor, wherein execution of at least one computer program product of the logic unit causes the room association device to:
receive content digitally encoded in the RF communications received by the RF signal receiver, said received content comprising data uniquely identifying the mobile device that conveyed a corresponding one of the RF communications, data identifying one of a plurality of optical sensors of the mobile device, where said identified optical sensor is one that detected at least one optical emission transmitted by the optical signal transmitter, data identifying the unique transmitter key and the sector key encoded within the identified optical sensor; and
transmit a digitally encoded message via said network transmitter, said digitally encoded message comprises encoded information based at least in part on the received content for determining a triangulated relative position of said mobile device, wherein the determining of the triangulated relative position is based on optical signals detected by the mobile device from the room association devices.

12. A room association device (RAD) comprising;
a processor for processing programmatic instructions;
a memory comprising a storage medium;

an optical signal transmitter for emitting optical signals in a plurality of different spatially constrained zones, each optical emission comprising digitally encoded data comprising a unique transmitter key associated with the room association device and a unique sector key that uniquely identifies which of the different spatially constrained zones is associated with the optical signals;

a radio frequency signal receiver for receiving radio frequency communications;

a network transmitter for conveying data digitally encoded within carrier waves over a network to a remotely located computing device;

a bus for communicatively linking said processor, said memory, said optical signal transmitter, said RF signal receiver, and said network transceiver; and a logic unit comprising at least one computer program product stored in said memory and executable by said processor, wherein execution of at least one computer program product of the logic unit causes the room association device to:

receive content digitally encoded in the radio frequency communications received by the radio frequency signal receiver, said received content comprising data uniquely identifying a mobile device, data identifying one of a plurality of optical sensors of the mobile device, where said identified optical sensor is one that detected at least one of the optical signals transmitted by the optical signal transmitter, data identifying the unique transmitter key and the sector key encoded within the identified optical sensor; and transmit a digitally encoded message Via said network transmitter, said digitally encoded message comprising encoded information based at least in part on the received content for determining a triangulated relative position of said mobile device, wherein the determining of the triangulated relative position is based on a set of optical signals detected by the mobile device.

13. The device of claim 12, wherein each of said optical transmitters of each of said room association devices repetitively transmits a sequence of a plurality of different spatially constrained zones of emissions, each sequence covering a sequence angle of space in the room relative to the optical transmitter producing the emission, said sequence angle being greater than sixty degrees of space and being less than one-hundred and eighty degrees of space, wherein each spatially constrained zone of each discrete emission of the sequence covers a zone angle of the room relative to the optical transmitter, said zone angle being an angle less than twenty five degrees, wherein each zone angle of emissions in the sequence is different than other zone angles of other emissions in the sequence, wherein a combination of the zone angles results in the sequence angle.

14. The device of claim 12, wherein each of the optical signals has a wavelength of approximately 904 nm and is a digitally encoded in a format compliant with a Multiple Integrated Laser Engagement System (MILES) defined standard.

15. The device of claim 12, wherein said optical transmitter is a scanning laser, wherein each of the optical signals is a digitally encoded in a format compliant with a Multiple Integrated Laser Engagement System (MILES) defined standard, wherein said radio frequency communication received by the radio frequency signal receiver is a digitally encoded in a format compliant with a Multiple Integrated Laser Engagement System (MILES) defined standard.

16. The device of claim 12, wherein said optical signal transmitter further comprises: a signal emitter configured to produce each of said optical signals;

a signal focus mechanism configured to focus energy generated by the signal emitter into said spatially constrained zones; and a signal encoder configured to digitally encoded information into said optical signals produced by said signal emitter.

17. The device of claim 12, further comprising:

logic unit comprising a plurality of computer program products stored in said memory and executable by said processor, said logic unit comprising:

an event handler configured to detect occurrences of definable events and to respond to detected occurrences by triggering an execution of previously defined computer program products; and conflict avoidance logic configured to prevent optical signals produced within a common room from interfering with each other.

18. A mobile device comprising:

a processor for processing programmatic instructions;

a memory comprising a storage medium;

a plurality of optical sensors for detected optical energy emissions comprising digitally encoded data;

an RF signal transmitter for transmitting content encoded within carrier waves within the RF spectrum;

a bus for communicatively linking said processor, said memory, said optical sensors, and said RF signal transmitter;

a logic unit comprising at least one computer program product stored in said memory an executable by said processor, wherein execution of at least one computer program product of the logic unit causes the mobile device to:

receive at least two different optical signals emitted from different optical transmitters;

for each received optical signal, decode via a processor content contained within the at least two different optical signals, said content comprising an indicator of an optical source that transmitted the corresponding one of the at least two different optical signals and the spatially constrained zone of the corresponding one of the at least two different optical signals;

query a tangible storage medium of the mobile device for an unique identifier of the mobile device; and transmit at least one radio frequency signal, comprising digitally encoded RF data, said RF data comprising, for each of the at least two different optical signals, the identifier of the optical source associated the corresponding one of the at least two different optical signals and the spatially constrained zone associated with the corresponding one of the at least two different optical signals, and a sensor identifier of a sensor that received the corresponding one of the at least two different optical signals, said RF data also comprising the unique identifier of the mobile device.

19. The device of claim 18, wherein each of the optical signals has a wavelength of approximately 904 nm and is a digitally encoded in a format compliant with a Multiple Integrated Laser Engagement System (MILES) defined standard.

* * * * *

UNITED STATES PATENT AND TRADEMARK OFFICE
CERTIFICATE OF CORRECTION

| | |
|---|---|
| PATENT NO. | : 8,218,971 B2 |
| APPLICATION NO. | : 12/684712 |
| DATED | : July 10, 2012 |
| INVENTOR(S) | : Steven Preston, Edward S. Kaprocki and Thomas H. Penner |

Page 1 of 1

It is certified that error appears in the above-identified patent and that said Letters Patent is hereby corrected as shown below:

Column 1, lines 8-14 please amend the specification to delete Paragraph [0001] regarding US Government rights as follows:

"STATEMENT REGARDING FEDERALLY SPONSORED RESEARCH OR DEVELOPMENT

[0001] This invention was made with U.S. Government support under Contract No. N61339-01-D-0717-0003 awarded by the U.S. Navy. The Government has certain rights in the invention including a paid-up license and the right in limited circumstances to require the patent owner to license others on reasonable terms as provided by for the terms of Contract No. N61339-01-D-0717-0003 awarded by the U.S. Navy."

Signed and Sealed this
Ninth Day of October, 2012

David J. Kappos
*Director of the United States Patent and Trademark Office*